Nov. 22, 1949  H. W. KEENAN ET AL  2,488,869
APPARATUS FOR MEASURING THE DRYING TIME
OF SURFACE-COATING MATERIALS
Filed Oct. 29, 1947  3 Sheets-Sheet 3

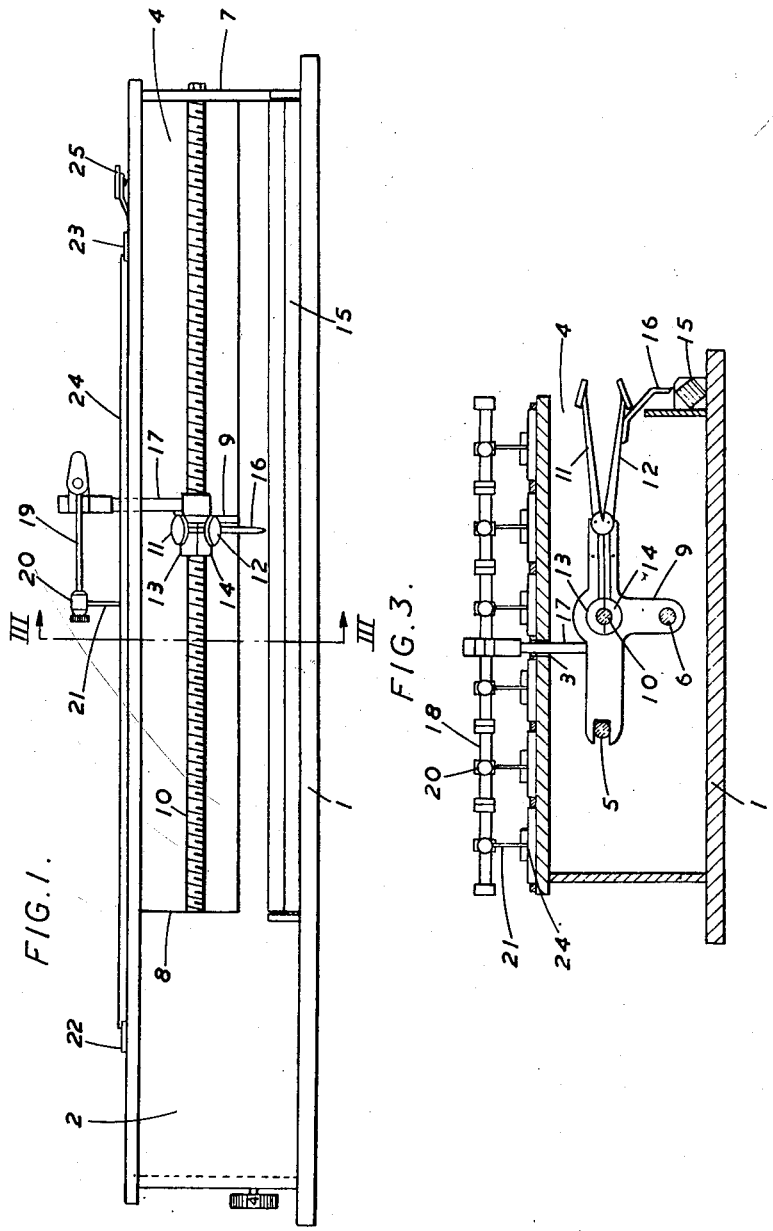

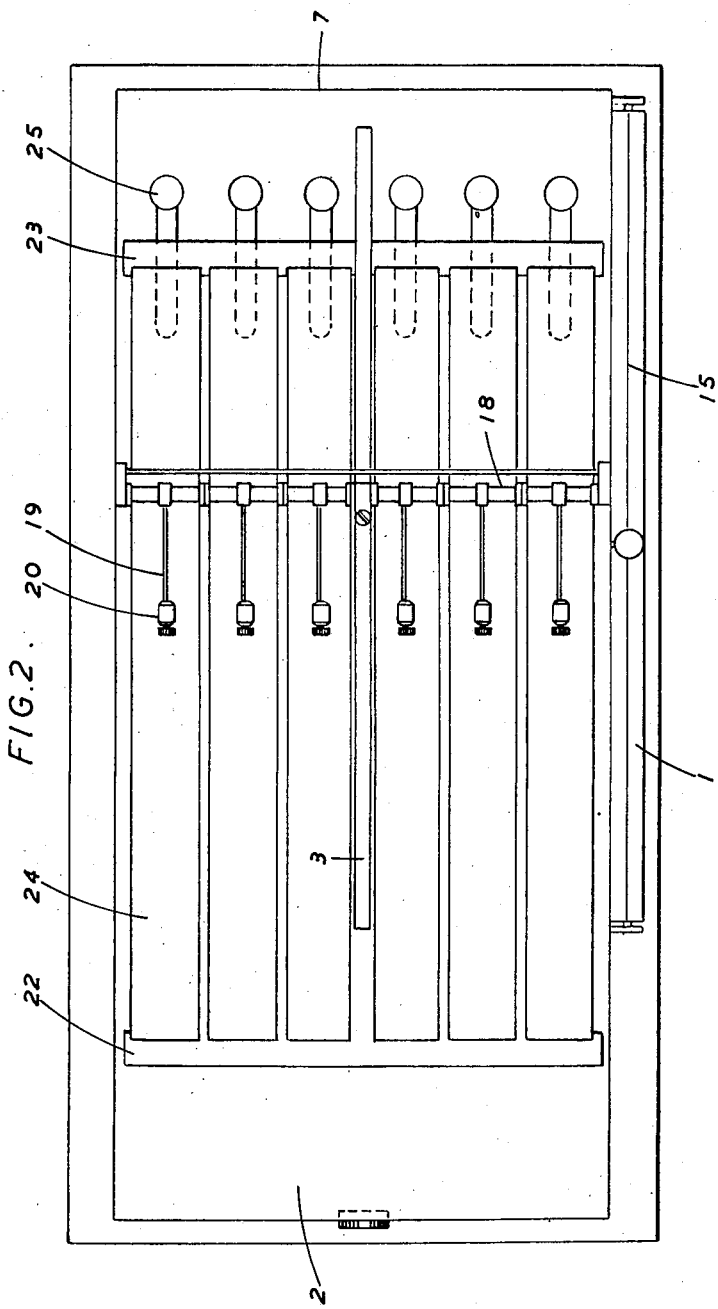

INVENTORS
HENRY WILFRID KEENAN &
JOSEPH HENRY JELLINEK

By Munson Ware
ATTORNEY

Patented Nov. 22, 1949

2,488,869

UNITED STATES PATENT OFFICE 2,488,869

APPARATUS FOR MEASURING THE DRYING TIME OF SURFACE-COATING MATERIALS

Henry Wilfrid Keenan, Hale, near Liverpool, and Joseph Henry Jellinek, Harrogate, England, assignors to Beck, Koller and Company (England) Limited, Speke, Liverpool, England, a British company Application October 29, 1947, Serial No. 782,874

2 Claims. (Cl. 73—150)

This invention relates to improvements in apparatus for measuring and recording the drying time of surface-coating materials, such as paints, varnishes and lacquers.

Many references have been made in the literature to methods and instruments for determining the drying rates of paints and varnishes and a useful summary of such methods is to be found in Gardiner's "Paints, Varnishes and Lacquers," 8th edition, page 270, but it is well known to those skilled in the art that no entirely satisfactory method has yet been described. In one known instrument a trail of sand is allowed to fall in diminishing concentric circles on a film of paint or varnish applied to a solid support rotated at a constant speed by drawing a sand hopper suspended above the film across the surface. The point at which the paint film is said to dry is that point from which the sand is readily removed by tapping the support or lightly brushing it with a camel hair brush, and the length of sand trail adhering to the panel can be readily related to the time by corelating it with the speed of revolution of the panel to arrive at the drying time. A similar method involves the replacement of the sand hopper by a felt wheel which impinges upon and moves across the surface of a paint film whereby its track can be observed during that stage of the drying process when the film is tacky, but no impression on the film is made by the felt wheel when the film becomes dry. These instruments are not only clumsy in use but like all other methods described provide only very limited information as regards the drying process which consists of certain well defined stages. Stage I coincides with the thickening or increase in viscosity of the film either by evaporation of solvent or by oxidation, so that it is no longer capable of being brushed nor will it flow out. Stage II coincides with the gelation of the film or the change from sol to gel structure, and stage III coincides with the polymerisation of the gel to a hard film.

It is an object of the present invention to provide an improved apparatus which not only clearly defines these three stages of drying, but also provides further knowledge regarding the physical characteristics of the film. It is a further object of the invention to provide an apparatus which is compact and easy to handle and enables a number of films to be tested simultaneously under various conditions of temperature and humidity and provides permanent records capable of easy storage.

Accordingly the present invention provides an apparatus for measuring and recording the drying time of surface-coating materials, comprising means for supporting a film of surface-coating material, means for drawing a needle across said film in a straight line and at constant speed, and means for measuring the distance travelled by said needle at any time.

The needle used in the apparatus should have a hemi-spherical tip which is drawn lengthwise through the film so that a track is described on the film, the character of which will be determined by the physico-chemical characteristics of the paints, varnishes or other surface-coating materials under observation. During stage I of the drying process already referred to, when the viscosity of the film is increasing, the original track made by the needle will be obliterated through the "flowing" of the film until such time as the viscosity is high enough for the track to remain permanent. This permanent track will continue to be traced until a fairly sharp change to stage II takes place and the film starts to gel. This change is evidenced by a change in character of the track traced by the needle. The new character of this track whilst being easily distinguishable from the track traced in stage I may vary quite widely in appearance, from the nature of which can be deduced other characteristics of the film related to adhesion, "through drying" and wrinkling properties. Finally, when stage III is reached and the film becomes hard dry, the needle over-rides the surface of the paint or other film and leaves no track. The time intervals for the second marked changes in the drying process just described are easily determined from the relation existing between the distances of these various tracks and the speed at which the needle is drawn through the film.

A preferred embodiment of the invention will be described with reference to the accompanying drawings, in which:

Fig. 1 is a side elevation and

Fig. 2 a plan view of the apparatus,

Fig. 3 is a cross-section on the line III—III of Fig. 1,

Figure 4:
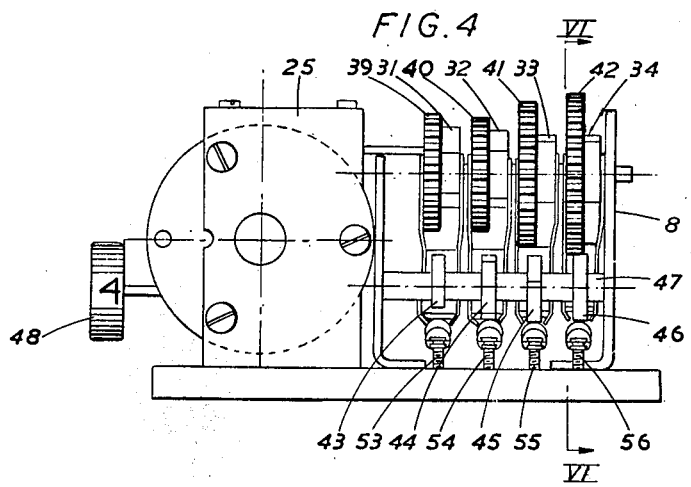
Fig. 4 is a side elevation.
Figure 5:
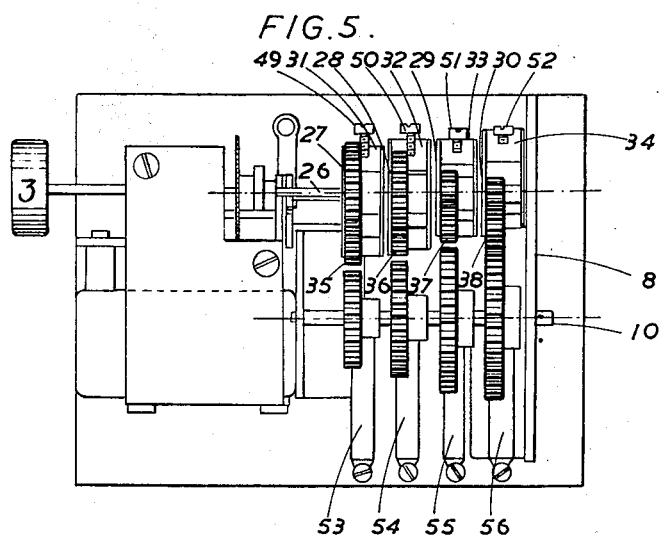
Figure 6:
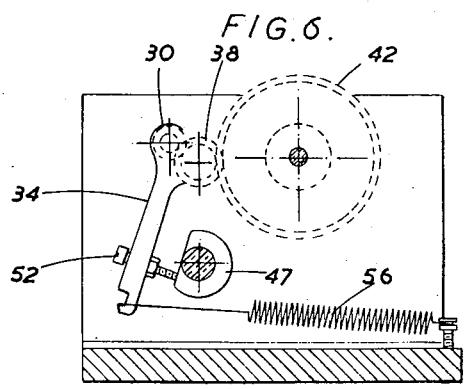

Fig. 5 a plan view of the electric motor and gear box of the apparatus on an enlarged scale, and Fig. 6 is a cross-section on the line VI—VI of Fig. 4.

Referring now to Figs. 1–3 of the drawings, a rectangular box 1 is provided with an end compartment 2, a longitudinal slot 3 extending in the top of the remainder of the box and an opening 4 in the side of the remainder of the box.

Within the box 1, horizontal parallel guide bars 5 and 6 extend from the partition wall 8 of the compartment 2 to the end wall 7 of the box. A T-shaped carriage 9 is slidably mounted on the bars 5 and 6, which it engages respectively with the foot and with one arm of the T. The carriage 9 is centrally apertured to receive a lead screw 10 disposed parallel to the guide bars 5 and 6 and journalled at one end in the end wall 7 and at the other end within the compartment 2. The other arm of the T carries pivotally mounted upper and lower levers 11 and 12, the inner ends of which carry half-nuts 13 and 14 normally engaging the lead screw 10. The outer ends of the lever 11 and 12 project through the opening 4 in the side of the box. Below the opening 4 a four-sided scale 15 is mounted outside the box, and is revoluble to present any desired side to a co-operating pointer 16 depending from the outer end of the lower lever 12.

The carriage 9 carries an upright pillar 17 projecting through the slot 3. The pillar 17 in turn carries a cross bar 18 disposed at right angles to the guide bars 5 and 6. The cross bar 18 carries a number of spaced arms 19 pivoted about the axis of the bar, and the ends of the arms 19 are provided with screw action holders 20 for downwardly directed hemi-spherical tipped needles 21. The top of the box 1 is provided wtih stops 22 and 23 recessed to receive the ends of narrow glass plates 24 arranged in parallel spaced relation beneath the needles 21. Levers 25 are provided to facilitate removal of the glass plates 24.

Referring now to Figs. 4–6, a synchronous electric motor 25 drives a shaft 26 carrying driving pinions 27, 28, 29, and 30. Levers 31, 32, 33 and 34, pivoted about the shaft 26 carry intermediate pinions 35, 36, 37 and 38 in constant mesh respectively with the driving pinions 27, 28, 29 and 30.

The lead screw 10 has a plain end extending through the wall 8 of the end compartment 2, and carrying pinions 39, 40, 41 and 42 co-operating with the intermediate pinions 35, 36, 37 and 38 respectively. Cams 43, 44, 45 and 46, mounted on a shaft 47 which terminates outside the box 1 in a control knob 48, co-operate respectively with the levers 31, 32, 33 and 34. The cams have the contour of a circle with a segment removed to form a flat, the flats of the successive cams 43, 44, 45 and 46 being successively displaced 90° around the axis of the shaft 47. Adjustable screws 49, 50, 51, 52 on the levers 31, 32, 33, 34 bear against the respective cams 43, 44, 45, 46 under the action of tension springs 53, 54, 55, 56 engaging the respective levers.

Referring more particularly to Fig. 6, it will be seen that the control knob 48 and shaft 47 may be rotated selectively to engage one only of the intermediate pinions with the corresponding pinion on the lead screw 10. In the position shown, the cam 47 presents a flat to the adjusting screw 52 on the lever 34, so that the latter under the action of the tension spring 56 swings around the driving shaft 26 to engage the intermediate pinion 38 with the pinion 42, drive being transmitted from the shaft 26 to the lead screw 10 through the gear train 30, 38, 42. Meanwhile the remaining cams present their raised portions to the remaining levers, keeping their associated pinions from engagement.

Preferably the speed of the motor and the gear ratios afforded by selective engagement of the four levers 31, 32, 33, 34 and their associated gear trains are such that the travel of the carriage 17 and needles 21 from end to end can be effected in 8, 12, 24 or 48 hours. The four sides of the revoluble scale 15 are appropriately calibrated, so that when the side of the scale 15 appropriate to the gear ratio selected is presented to the pointer 16, the travel of the needles 21 may be read off in terms of elapsed time. By actuating the levers 11 and 12 to disengage the half nuts 13 and 14, the carriage 17 and needles 21 may be returned to the zero position for the commencement of each run.

The instrument described can be employed not only in a horizontal position, but also in a vertical or inclined position if desired. The instrument is sufficiently small and compact to be enclosed within a cabinet to which auxiliary apparatus may be attached to provide special conditions under which drying tests may wish to be carried out for example, various conditions of temperature, humidity, light and atmosphere.

We claim:

1. Apparatus for measuring the drying time of surface coating materials, comprising a frame adapted to support a plurality of longitudinally extending parallel strips coated with surface-coating materials, a carriage mounted to move longitudinally of and parallel to said strips, a plurality of needle holders on said carriage and adapted to carry depending needles bearing on said strips, a lead screw journalled in said frame and operatively connected to said carriage to advance the same, a multi-speed gear box coupled in driving relation to said lead screw, a constant speed motor coupled in driving relation to said gear box, a pointer actuated by said carriage and a multi-sided scale revoluble about an axis extending longitudinally of said frame to present any desired side to said pointer, the sides of said multi-sided scale bearing calibrations proportioned in relation to the speeds of said multi-speed gear box.

2. Apparatus for measuring the drying time of surface-coating materials comprising a rectangular box, stops for positioning longitudinally of the box on the top thereof spaced parallel strips coated with surface-coating material, guide bars within the box disposed parallel to said strips, a carriage slidably mounted on said guide bars, a longitudinal slot in the top of said box, a pillar on said carriage extending upwards through said slot, a cross bar on said pillar at right angles to and above said strips, a plurality of arms pivoted about said cross bar, needle holders at the ends of said arms adapted to carry downwardly extending needles bearing on said strips, a lead screw disposed within said box and operatively connected to said carriage to advance the same, a multi-speed gear box within said box coupled in driving relation to said lead screw, a constant speed electric motor within said box coupled in driving relation to said gear box, a pointer projecting from said carriage, and a multi-sided scale revoluble about an axis parallel to said strips to present any desired side to said pointer, the sides of said multi-sided scale bearing calibrations proportioned in relation to the speeds of said multi-speed gear box.

HENRY WILFRID KEENAN.
JOSEPH HENRY JELLINEK.

REFERENCES CITED

The following references are of record in the file of this patent:

UNITED STATES PATENTS

| Number | Name | Date |
| --- | --- | --- |
| 665,966 | Miles | Jan. 15, 1901 |
| 1,458,529 | Hill | June 12, 1923 |
| 1,666,634 | Thomson | Apr. 17, 1928 |